United States Patent [19]
Potts

[11] Patent Number: 6,122,697
[45] Date of Patent: Sep. 19, 2000

[54] SYSTEM FOR EXTENDING THE WIDTH OF A DATA BUS

[75] Inventor: David Lawson Potts, Royersford, Pa.

[73] Assignee: Lucent Technologies, Inc., Murray Hil, N.J.

[21] Appl. No.: 09/100,890

[22] Filed: Jun. 22, 1998

Related U.S. Application Data

[60] Provisional application No. 60/065,855, Nov. 14, 1997.

[51] Int. Cl.$^7$ .................................................. G06F 13/38
[52] U.S. Cl. ......................... 710/127; 710/130; 710/100
[58] Field of Search .................................... 710/127, 126, 710/128, 129, 52, 66, 130; 709/200, 238; 340/825.25; 370/908, 912

[56] References Cited

U.S. PATENT DOCUMENTS

| | | | |
|---|---|---|---|
| 5,280,598 | 1/1994 | Osaki et al. ............................ | 710/127 |
| 5,300,811 | 4/1994 | Suzuki et al. ............................ | 257/691 |
| 5,337,409 | 8/1994 | Sakata ..................................... | 345/501 |
| 5,548,766 | 8/1996 | Kaneko et al. .......................... | 710/127 |
| 5,671,373 | 9/1997 | Prouty et al. . | |
| 5,812,798 | 9/1998 | Moyer et al. ............................ | 710/127 |

OTHER PUBLICATIONS

Analog Devices et al., "Audio Codec '97; Component Specification; Revision 1.03; Sep. 15, 1996", Sep. 15, 1997.
Intel Corporation, "Audio Codec '97; Revision 2.0, Sep. 29, 1997", Sep. 29, 1997.

*Primary Examiner*—Gopal C. Ray
*Attorney, Agent, or Firm*—William H. Bollman

[57] ABSTRACT

One aspect of the present invention provides a packer-unpacker (PUP) for a digital serial interface which allows a plurality of processors to access time slot registers of a serial data stream relating to the digital serial interface. A configuration register is maintained either by one of the plurality of processors or by each of the processors to arbitrate access to the individual time slot registers. Another aspect of the invention allows one or more processors to efficiently access and/or write more bits to a resource such as a time slot register than the width of the processor's respective data bus allows. Extra bits registers are maintained for at least one of the read and write direction data busses. The extra bits correspond to the least significant bits conventionally ignored in changing from a data bus of one width to a data bus of a narrower width. The extra bits in the write direction are accessed, e.g., by a write to a write direction extra bits register addressable through a specific input/output (I/O) location. The extra bits are tacked on to a subsequent write cycle in the digital serial interface, e.g., in the AC '97 link, to write an excess length data word.

51 Claims, 7 Drawing Sheets

AC-LINK AUDIO OUTPUT FRAME

SYSTEM FOR EXTENDING THE WIDTH OF A DATA BUS

This application claims priority from U.S. Provisional Application No. 60/065,855 entitled "Multipurpose Digital Signal Processing System" filed on Nov. 14, 1997, the specification of which is hereby expressly incorporated herein by reference.

BACKGROUND OF THE INVENTION

1. Field of the Invention

This invention relates to a digital interface. More particularly, it relates to an improved digital interface for an AC '97 controller having expandable and automatic capabilities including effectively increased bus width, accessibility by a plurality of processors, and automatic creation of tag bits.

2. Background of Related Art

Efficient and inexpensive digitization of telephone grade audio has been accomplished for many years by an integrated device known as a "codec." A codec (short for COder-DECoder) is an integrated circuit or other electronic device which combines the circuits needed to convert analog signals to and from digital signals, e.g., Pulse Code Modulation (PCM) digital signals.

Early codecs converted analog signals at an 8 KHz rate into 8-bit PCM for use in telephony, and were not capable of handling modem inputs. More recently, the efficiency and low cost advantages of codecs have been expanded to convert analog signals at a 48 KHz sampling rate into 16-bit stereo (and even up to 20-bit stereo with processors having a 20-bit data bus) for higher quality use beyond that required for telephony. With higher quality and broader bandwidth capability, today's codecs find practical application with consumer equipment such as voice band modems.

With the development of codecs for these more sophisticated purposes came the need to improve the analog signal-to-noise (S/N) ratio to at least 75 to 90 dB. One major step toward achieving this high S/N ratio was accomplished more recently by separating the conventional codec into two individual sub-systems: a controller sub-system or integrated circuit (IC) handling primarily the digital interface to a host processor, and an analog sub-system or IC handling primarily the interface to, mixing and conversion of analog signals. This split digital/analog architecture has been documented recently as the "Audio Codec '97 Component Specification", Revision 1.03, Sep. 15, 1996; and the "Audio Codec '97", Revision 2.0, Intel Corporation, Sep. 29, 1997, (collectively referred to herein as "the AC '97 Specification"). The AC '97 Specification, i.e., both Revision 1.03 and 2.0 in their entirety are expressly incorporated herein by reference.

FIG. 5 shows a conventional split-architecture audio codec such as that defined by the AC '97 Specification interfacing to an analog device, e.g., to a modem 510.

In particular, an AC controller sub-system 500 interfaces to an AC analog sub-system 502 via a five-wire time division multiplexed (TDM) bus referred to as the AC link 504a, 504b. The five-wire TDM bus of the AC link 504a, 504b comprises a sync signal 512, a reset signal 520, a serial TDM data stream SDATA_OUT 516 from the AC controller sub-system 500 to the AC analog sub-system 502, a bit clock signal BIT_CLK 514, and a serial TDM data stream SDATA_IN 518 from the AC analog sub-system 502 to the AC controller 500. The bit clock signal BIT_CLK 514 is typically derived from an external crystal 508.

The circuitry in the conventional AC analog sub-system 502 which interfaces to an external analog device typically includes an analog-to-digital converter (ADC) 522 and a digital-to-analog converter (DAC) 524. The ADC 522 samples the analog signal input to the AC analog sub-system 502 and provides 16-, 18- or 20-bit data at 48 Ks/s to the AC link 504b for insertion into, e.g., time slot 5 of the serial TDM data stream SDATA_IN 518 to the AC controller sub-system 500. Conversely, the DAC 524 receives 16-, 18- or 20-bit data from the serial TDM data stream SDATA_OUT 516 from the AC controller sub-system 500 and converts the same into an output analog signal, e.g., output to the low-speed voice band modem 510.

Conventional demodulation and modulation techniques such as quadrature amplitude modulation (QAM) or Carrierless Amplitude and Phase (CAP) may be performed by a digital signal processor (DSP) and/or other processor in conjunction with the ADC 522 and DAC 524.

FIG. 6 depicts a conventional sync or frame signal 512, serial TDM data stream SDAT_OUT 516, and serial TDM data stream SDATA_IN 518, in a twelve slot (plus slot 0) TDM bi-directional data stream between the analog and controller sub-systems 502, 500 of a split-architecture audio codec such as in accordance with the AC '97 Specification. The twelve time slots 1 to 12 of the serial TDM data streams SDATA_OUT 516 and SDATA_IN 518 are framed by the sync signal 512, which is derived from a TAG Phase 600 during time slot 0. The TAG Phase 600 contains 16 bits, bit 0 of which corresponds to the presence of active data in any of time slots 1 to 12, and bits 1 to 12 which correspond respectively to the presence of active data in time slots 1 to 12, respectively. Bits 13 to 15 of the TAG Phase 600 are currently undefined in the AC '97 Specification.

Time slots 1 and 2 of the serial TDM data stream SDATA_OUT 516 from the AC controller sub-system 500 to the AC analog sub-system 502 comprise command addresses 601 and command data 602. Status addresses 621 and status data 622 are passed in time slots 1 and 2 of the serial TDM data stream SDATA_IN 518 from the AC analog sub-system 502 to the AC controller sub-system 500. Time slots 3 and 4 of the serial TDM data stream SDATA_OUT 516 and serial TDM data stream SDATA_IN 518 comprise the stereo pulse code modulated (PCM) audio data between the AC analog sub-system 502 and the AC controller sub-system 500. Time slot 5 of the serial TDM data stream SDATA_IN and SDATA_OUT 518, 516 conventionally contains the data from and to the low speed voice band modem 510 (FIG. 5). Time slot 6 of the serial TDM data stream SDATA_IN 518 contains microphone PCM data. The remaining time slots 7 through 12 of both the serial TDM data stream SDATA_IN and SDATA_OUT 518, 516 and time slot 6 of the serial TDM data stream SDATA_OUT 516 are unused in the conventional split-architecture audio codec.

The active status of TAG bits are conventionally written to once each frame by the processor in the AC controller sub-system 500. All time slots (i.e., slots 1–12) are 20 bits wide with the exception of the TAG phase 600 in slot 0, which is 16 bits wide.

FIG. 7 depicts in more detail the serial TDM data stream SDATA_OUT 516 with reference to the sync signal 512 and the bit clock signal BIT_CLK 514 in the current implementation of the AC '97 Specification. The conventional bit clock signal BIT_CLK 514 is a fixed 12.288 MHz clock signal derived in the clock 506 from the external 24.576 MHz crystal oscillator 508 (FIG. 5).

Conventional AC '97 split-architecture systems accommodate only one processor, treating the AC '97 link as a single device to be used by only one processor. However, it has been appreciated by the present inventor that more recent applications would benefit from access to the AC '97 link and the AC '97 Analog sub-system by a plurality of processors, either all within the AC controller sub-system 500 and/or external to the AC controller sub-system 500. There is thus a need for an interface in an AC controller system which can provide access to the AC '97 link and AC '97 Analog sub-system by any of a plurality of processors.

Moreover, conventional data buses for suitable processors in an AC controller sub-system 500 generally include a standard 16-bit data bus. However, many of the components and corresponding time slot registers in the AC '97 system are capable of use with more accuracy than 16 bits, e.g., with 20 bits. Conventionally, when a 16 bit data bus is utilized in an AC '97 device, the least significant 4 bits in the 20 bit registers in the AC controller sub-system and/or AC analog sub-system are filled with zeroes to left-justify the available 16 bit data in a 20 bit register. Thus, the increased accuracy provided by the 20-bit capability of the AC '97 Specification may not be fully utilized. Thus, there is a need for a method and apparatus which allows efficient use of the 20 (or more) bit capability of an AC '97 Analog sub-system with data transfers limited to a data bus smaller than the general register width in the AC '97 link.

Lastly, the TAG phase in the AC link's data stream is updated each frame (e.g., at a rate of 48 KHz). As discussed, bit 0 of the TAG Phase 600 indicates whether any of slots 1–12 contain active data, and bits 1–12 indicate whether or not a corresponding slot 1–12 contains active data. Typically a processor in a conventional AC controller sub-system is saddled with the task of assembling the appropriate bits of the TAG phase and all at once writing to a register corresponding to data sent in time slot 0 once each frame. This task consumes a significant amount of processing time and requires prioritized action by the processor each frame. There is thus a need for a method and apparatus which automates the creation of the TAG Phase 600 to free the processor to handle other tasks.

SUMMARY OF THE INVENTION

In accordance with the principles of the present invention, an extra bits register comprises storage for at least two least significant bits of a data word in excess of a first bit width of a first data bus over which the data word is transmitted.

A method of extending a bit width of a data bus in accordance with the principles of the present invention comprises providing a first data bus having a first bit width. An extra bits register accessible from the first data bus is also provided. An output of the extra bits register is combined with the first data bus to provide a second data bus having a second bit width larger than the first bit width.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Aspects of the present invention provide a packer-unpacker (PUP) digital interface which allows a plurality of processors to access time slot registers of a serial data stream, which allows one or more processors to efficiently access and/or write more bits than the width of the processor's respective data bus, and which automatically updates a status register. A PUP digital interface in accordance with the principles of the present invention is particularly useful in applications including an AC controller sub-system, and thus the present invention is described with respect to an application including an AC controller sub-system. However, it is to be understood that the principles of the present invention have applications in addition to those relating to the AC '97 Specification and functions other than those specifically described within the AC '97 Specification functionality.

An AC '97 link is conventionally designed to support a single processor or controller for all twelve channels. However, the conventional AC '97 link does not accommodate a scenario wherein a plurality of processing agents need to access any or all of the channels or time slots, e.g., through accessing temporary time slot registers. In accordance with the principles of the present invention, access is provided to an AC '97 link or other digital serial interface by any of a plurality of processing agents with an arbitration scheme which is provided on a per channel basis, either during power up of the AC '97 devices or as the accesses occur. Thus, e.g., each channel or time slot in an AC '97 link can be considered to be an independent resource which is configurable for access by any of a plurality of requesting processors. One example arbitration protocol is a well known first-come, first-served protocol. Of course, other protocols are possible within the scope of the present invention.

Figure 1:
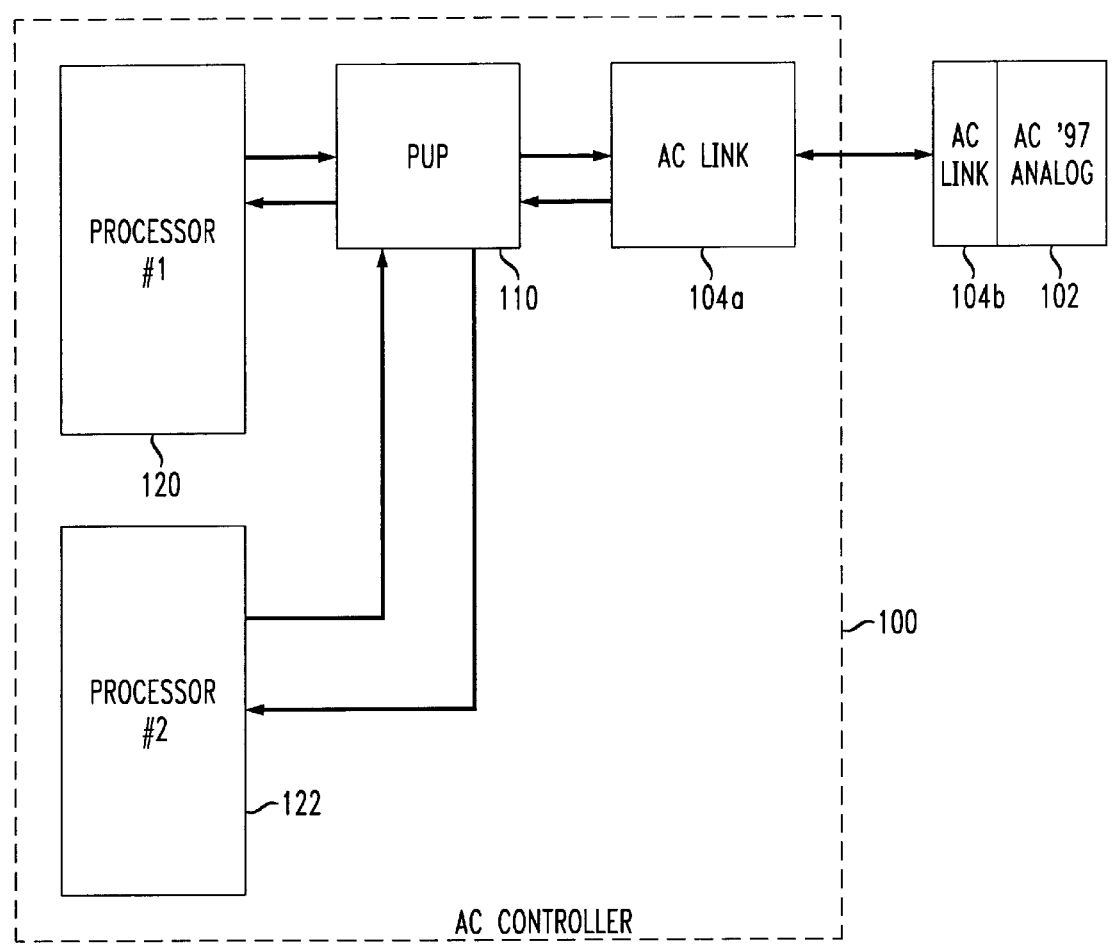
FIG. 1 shows an AC '97 Controller implementing a packer-unpacker (PUP) digital interface in accordance with an embodiment of the present invention.

FIG. 1 shows the implementation of a first come, first served protocol in a packer-unpacker (PUP) digital interface module 110 included in the AC Controller sub-system of a split-architecture audio codec. The first-come, first-served protocol allows full speed access by the successful requesting processor.

In particular, as shown in FIG. 1, an AC controller sub-system 100 communicates with an AC Analog sub-system 102 through an AC link 104a, 104b. A conventional five-wire TDM serial data bus separates the AC Controller sub-system 100 from the AC link 104a, 104b of the AC Analog sub-system 102. Although the present invention is not limited to a TDM serial data bus having five wires only, it is the presently preferred embodiment for maximum conformity with the current AC '97 standard. It is recognized and appreciated that the standard may and will change over time, and may even be disbanded. Thus, although the disclosed embodiment is described with respect to the AC '97 standard, it is not so limited.

The current AC '97 standard limits each 48 KHz frame to containing 20 bit wide samples within the boundaries of respective time slots. However, the present invention is also applicable to samples having more than 20 bits, e.g., spanning more than a single time slot.

Figure 2:
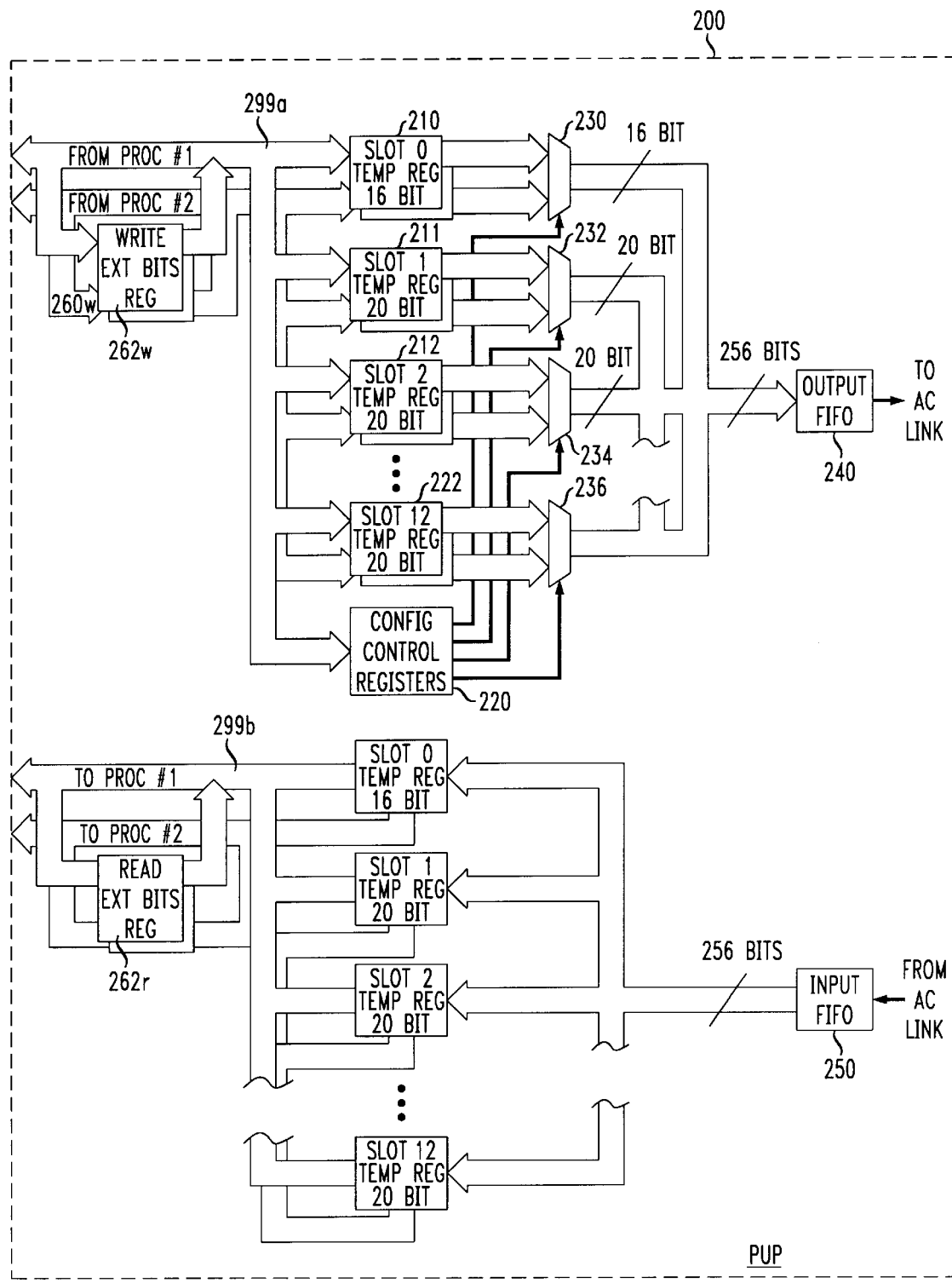
FIG. 2 is a more detailed block diagram of the PUP shown in FIG. 1.

FIG. 2 shows the use of a set of configuration control registers 220 to control access by a plurality of processors to resources in the PUP 200, e.g., time slot registers 210–222. Alternatively, each processor can have a configuration control register 220 associated therewith. In this case, access to the individual time slots, e.g., to the requested temporary time slot register(s), can be granted to the first processor to ask for access to that particular time slot or resource. The processor might first read the status of the configuration control register to determine if another processor in the system currently has access to a particular time slot or resource. If not, then the processor can write to its respective configuration control register 200 a representation of the number (e.g., 0 to 12) of the time slot or resource that the processor desires to access. Alternatively, access to the time slots or resources can be granted on a bit-wise basis by the configuration control register.

After writing a value into the relevant configuration control register to gain access to a particular time slot or resource, the processor can read back the value of the configuration control register to determine which of the requested time slots or resources that the relevant processor has been granted access to.

Preferably, each processor that requires access to the AC '97 link in the disclosed embodiment includes a dedicated configuration register 220, e.g., in the PUP 200. In the disclosed embodiment, the configuration register 220 uses bits 1 to 12 to represent access to time slots 1 to 12 of the AC '97 link, respectively. Bit 0 is used to indicate when the configuration is complete.

Referring back to FIG. 2, a processor initially causes the configuration control register 220 to contain suitable bit settings to allow the appropriate multiplexers 230–236 to allow access to the output FIFO 240. To configure the configuration control register 220, the bit position corresponding to the desired time slot or resource is written to by the relevant processor. Whenever a processor desires write access to any particular resource such as a time slot register, it first writes to the configuration control register 220 to obtain permission to write to, e.g., one of the temporary registers 210–222 corresponding to the time slot. Preferably, writes to the temporary registers of unconfigured time slots or resources are ignored.

Figure 6:
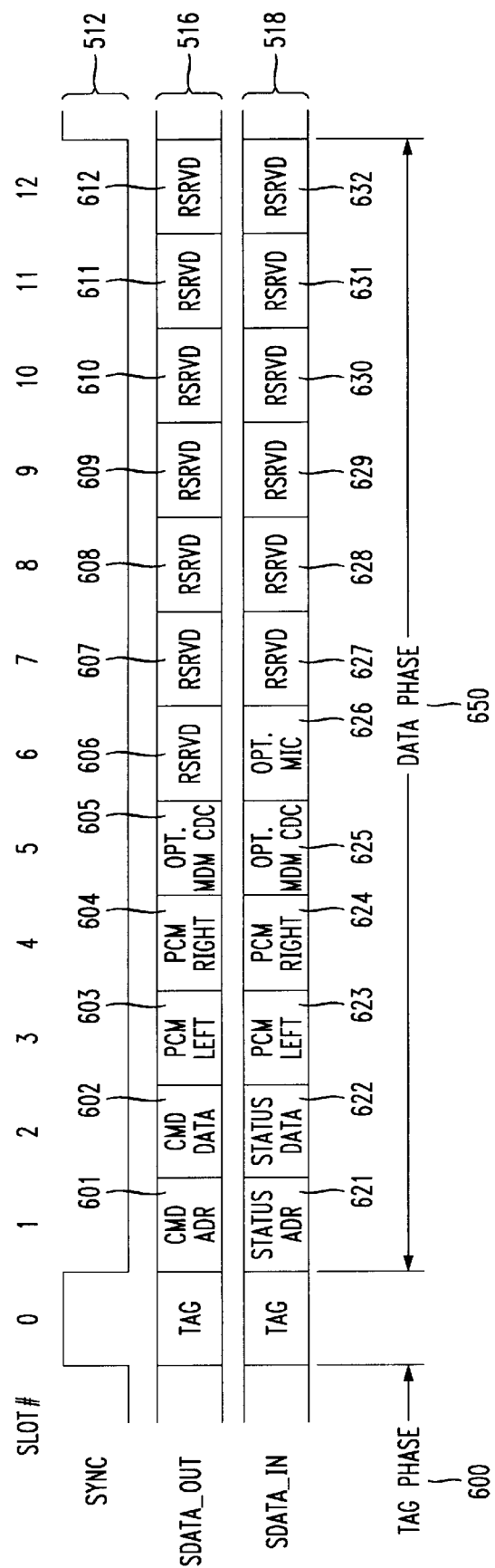
FIG. 6 depicts the time slots of a conventional split-architecture audio codec bi-directional TDM audio frame such as that of the AC link of the AC '97 Specification.
Figure 7:
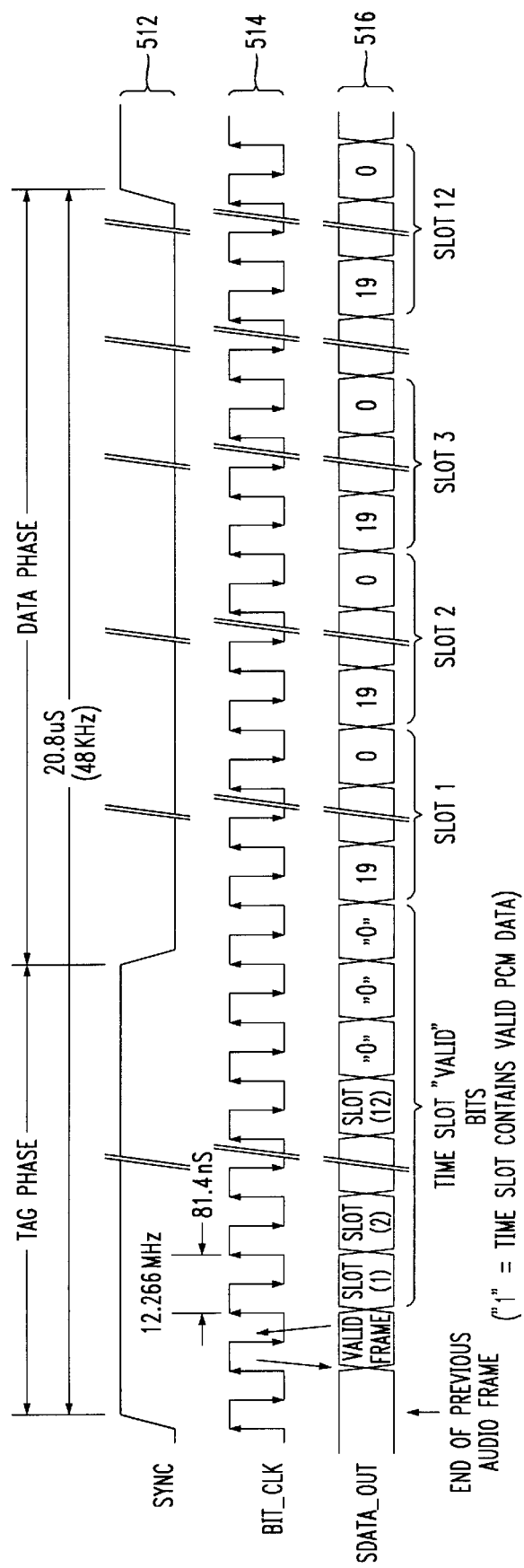
FIG. 7 depicts the bits of an audio output frame of a conventional split-architecture audio codec such as that of the AC link of the AC '97 Specification.

For example, if processor #1 desires to write to the command data register of the AC Analog via time slot 2 (602 in FIG. 6), processor #1 would set bit 2 in the configuration control register 220 (FIG. 2). Thereafter, processor #1 polls bit 0 of the configuration control register 220 until it goes high, and then polls bit 2 of the configuration control register 220 until it goes high, indicating that access to the command data register is granted to processor #1 via the temporary register 212 of time slot 2. Thus, once bit 0 goes high, any bit that is set, i.e., any of bits 1 to 12, would indicate that the processor has been granted access to write to the corresponding time slot register.

Preferably, bit 0 of the configuration control register 220 is cleared upon writes to the configuration control register 220.

When a processor has completed its access to a particular resource, e.g., time slot register, and desires to release its ownership of that resource, the processor can clear the corresponding bit in the configuration control register 220 (i.e., write a zero to the bit location). Preferably, writing a zero to a bit location will clear that bit location, but writing a one to a bit location that is already set will have no effect.

If a processor has requested permission to access a particular resource such as a time slot but did not receive permission to access that location, another processor likely has ownership of that particular resource, e.g., time slot register. The requesting processor in a preferred embodiment waits for the currently owning processor to release its ownership of that resource before the newly requesting processor is granted access. Alternatively, the processors may communicate directly with one another to negotiate a release of ownership by an owning processor so that a newly requesting processor can access that particular resource, e.g., time slot register.

Preferably, once a processor gains permission to access a particular time slot register or other resource, it will retain ownership of that particular time slot register or other resource until relinquished through an appropriate setting in the configuration control register 220, e.g., by clearing a corresponding bit in the configuration control register 220.

Thus, utilization of a configuration control register and appropriate multiplexing or switching circuitry in accordance with the principles of the present invention can allow a plurality of processors (e.g., microprocessors, microcontrollers, digital signal processors, and/or on demand transfer engines) to share access to one or more digital interface resources such as time slot registers or other components in a serial digital interface such as an AC '97 link.

In another aspect of the present invention, the bit width of a data bus can be effectively increased through the use of an extra bits register.

While the conventional AC '97 interface protocol allows for data samples to be 20 bits in length, the processor devices in most AC '97 controller sub-systems support only 16 bit data paths. Thus, data that is transferred to or from AC '97 analog sub-systems via an AC '97 link is conventionally left justified into a 20 bit format, i.e., most significant bit (MSB) first with zeroes filled in the least significant bits (LSBs).

In accordance with the principles of this aspect of the present invention, 16 bit or other processor devices may efficiently submit 20 bit data samples to a digital serial interface such as the AC '97 link. In the disclosed embodiments, this is achieved with preferably only one extra input/output (I/O) address.

In particular, the AC '97 Specification calls for support of data samples which are 20 bits in width, but also allows for the use of 16 bit data by ignoring (i.e., not using) the lower or least significant four bits of data. Current AC '97 devices supply 16 bit data to the AC '97 link to resources which support up to 20 bit wide data words.

As shown in FIG. 2, the present invention incorporates extra bits registers 262w, 262r in the write and read directions, respectively, to effectively enlarge the width of the data bus from the processor(s). Each read of a resource such as a time slot register 210–222 supporting more than 16 bits performed via the PUP 110 of the AC '97 controller sub-system 100 (FIG. 1) will latch the lower four data bits into a read direction extra bits register 262r. The read direction extra bits register 262r is mapped to a different address than that location being read.

The read direction extra bits register 262r is as wide as necessary to accommodate the 'extra bits', e.g., 20 bits–16 bits=4 bits. If the reading processor desires operation on 20 bit data, rather than ignoring the lower four bits of data read from the AC '97 Analog sub-system 102 as in conventional audio codecs, the processor will additionally read the read direction extra bits register 262r, preferably on the next read cycle. Preferably, the read direction extra bits register 262r will be overwritten during every read cycle such that a read from any location other than from the read direction extra bits register 262r will invalidate the contents of the read direction extra bits register 262r. Thus, if the read direction extra bits register 262r is not read immediately, the data in the read direction extra bits register 262r will be overwritten with the lower four bits of the next location that is read via the data bus 299b.

If a processor is reading or writing data which is only 16 bits in length, then the PUP 200 may operate in conventional fashion and allow the bits of the read (or write) direction extra bits register 262r to be automatically cleared. However, if the processor elects to transfer data which is longer than the width of the data bus, e.g., wider than 16 bits, it can do so in accordance with the principles of this aspect of the invention by generating multiple accesses to the PUP 110.

In the write direction, for the processor to write 20 bit data to a location accessed via the 16 bit data bus 299a, the processor first writes the lower four bits into a write direction extra bits register 262w (FIG. 2). Thereafter, the processor writes to the desired resource (e.g., register or other location) accessed via the 16 bit data bus 299a. Thus, in accordance with the principles of this aspect of the present invention, the lower four bits previously written to the write direction extra bits register 262w will be automatically tagged onto the second write operation to the desired register, with the result being a 20 bit write of a 20 bit value over the 16 bit data bus 299a.

For subsequent write operations, unless the write direction extra bits register 262w is again written to, and the write direction extra bits register 262w will be cleared. Thus, the lower or least significant bits, e.g., the lower four bits of subsequent writes to locations accessed via the write data bus 299a, will be stuffed with zeroes. Preferably, the write operations of the lower four bits and that of the upper 16 bits are performed in adjacent write cycles, but may be separated by one or more clock cycles.

Figure 3:
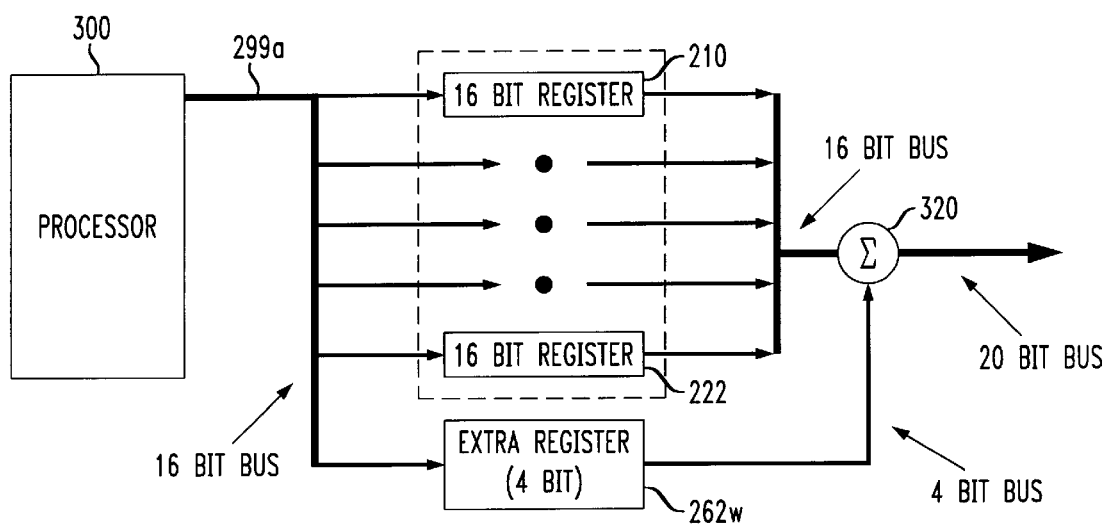
FIG. 3 is a block diagram showing the effective result of an extra bits register in accordance with one aspect of the present invention.

FIG. 3 depicts the effective block diagram of the implementation of a 20 bit data path from the perspective of one processor 300, e.g., a DSP, utilizing a 16 bit wide data bus 299a.

Figure 4:
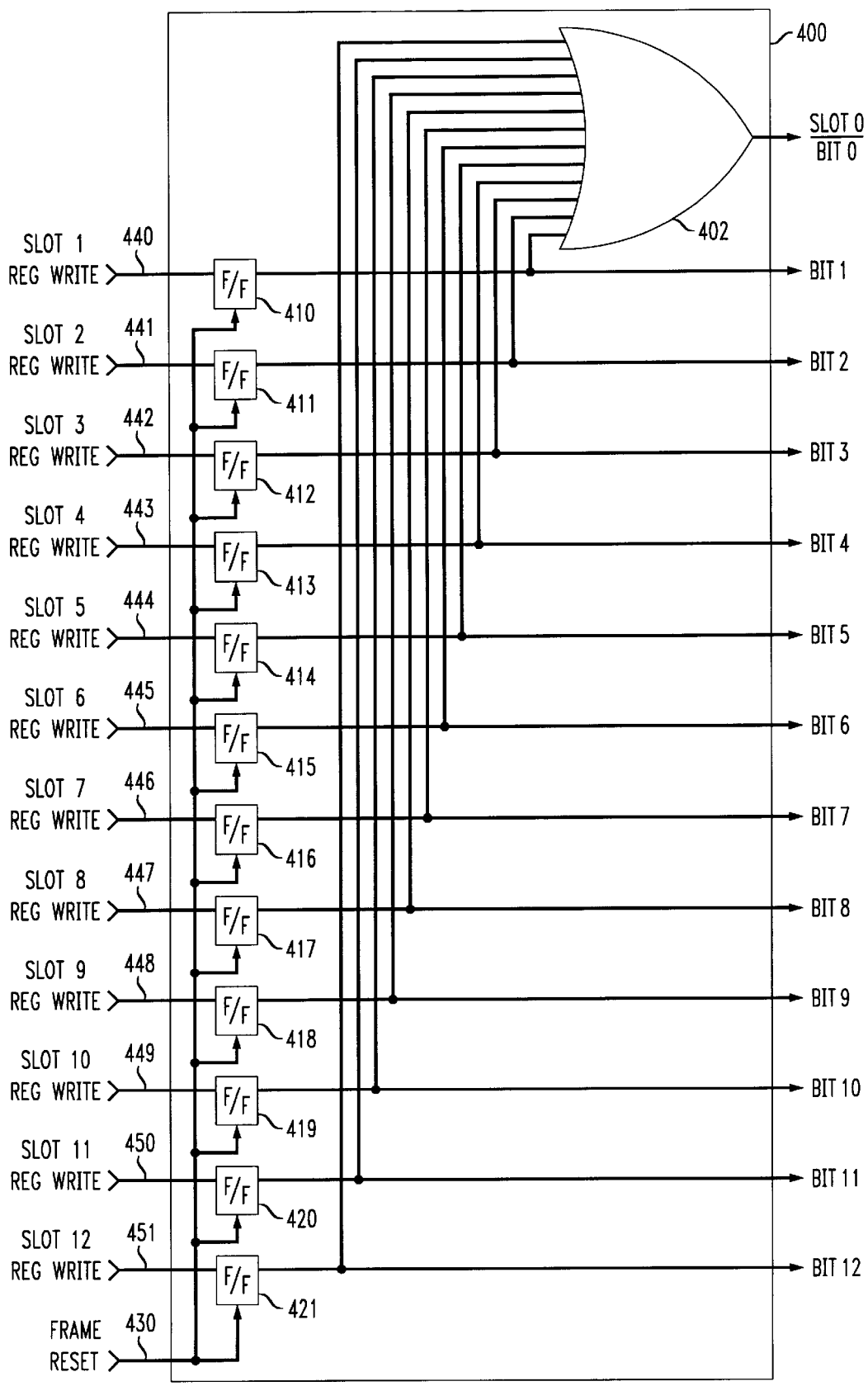
FIG. 4 shows an embodiment of an automatic TAG Phase register in accordance with another aspect of the present invention.
Figure 5:
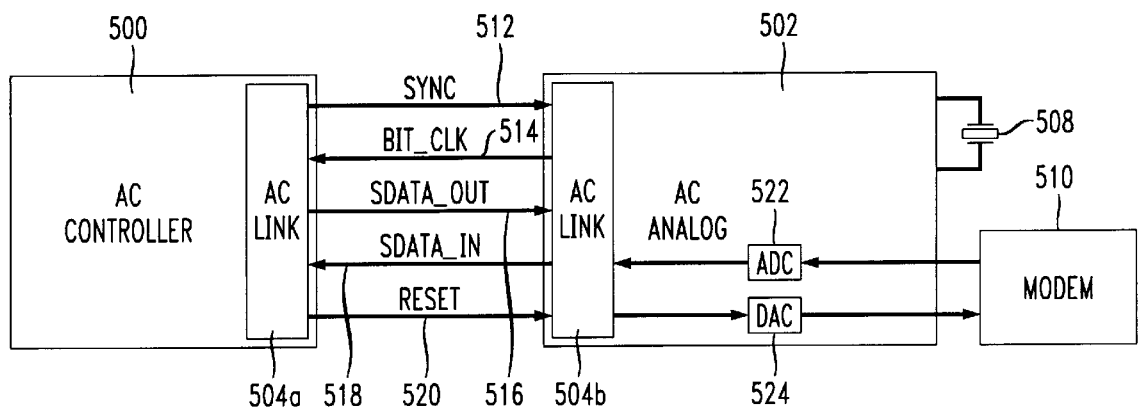
FIG. 5 shows a conventional split-architecture audio codec such as that defined by the AC '97 Specification interfacing, e.g., to a low speed voice band modem.

In FIG. 4, the extra bits written to the write direction extra bits register 262w are effectively added at point 320 to the 16 bits of data passed through the time slot temporary registers 210–222, and passed on via a larger width bus, e.g., having 20 bits in width.

This aspect of the present invention may or may not be utilized with more than one processor, and thus is applicable to shared as well as non-shared digital interfaces. Moreover, this aspect of the present invention is most suitable for use with systems which most frequently transfer data within the boundaries of the data bus utilized, but which occasionally make use of increased accuracy with data samples or words having a length exceeding the width of the data bus. Thus, only one additional I/O cycle is required in a preferred embodiment for extra wide data transfers.

Accordingly, this aspect of the present invention provides for multiple length data transfers over a relatively narrow data bus without changing modes, and without multiplexing in additional data lines.

Another aspect of the present invention provides a register which automatically generates status information relating to valid data in a corresponding resource location, e.g., time slot register. While this aspect has particular application for use in a TAG Phase register in an AC '97 component, it is equally applicable to applications other than relating to the AC '97 Specification.

The conventional AC '97 link requires the insertion of a TAG Phase word in time slot 0, i.e., prior to the time slots in the serial interface containing data. The TAG Phase time slot 0 is 16 bits in length, bit 0 of which indicates active or valid data in any of the corresponding time slots. Bits 1 to 12 of the TAG Phase indicate the presence of valid data in corresponding time slots 1 to 12. The unused, most significant bits (MSBs) of the TAG Phase, i.e., bits 13 to 15, are always zero in current AC '97 devices. Of course, the present aspect is applicable for the automatic creation of a status word of any length, e.g., for only one bit or for 16 bits or more.

Conventionally, the 16 bit TAG Phase word is compiled by the software of the processor which writes data to the AC '97 Controller and output as a word to a register for insertion into time slot 0. The present invention provides an automated technique and apparatus for generating and inserting a status word such as the TAG Phase word into time slot 0 of, e.g., the AC '97 link.

According to the principles of this aspect of the present invention, the register corresponding to data input to the TAG Phase time slot 0 is cleared every frame cycle, e.g., at the beginning of every frame cycle. Whenever any processor or other device writes to the PUP 110 (FIG. 1), the bit of the register corresponding to data input to the TAG Phase is automatically set to a one by a write pulse to the corresponding temporary time slot register 210–222 (FIG. 2) for the duration of that frame. At the end of the frame, the automatically compiled register corresponding to data input to the TAG Phase will be reset and a new TAG Phase will be developed based on new valid data written to registers corresponding to any or all of the remaining time slots, e.g., time slots 1 to 12. Preferably, the new valid data written to the time slot registers in one frame will be output in its corresponding time slot of the serial interface in the following frame.

FIG. 4 shows an embodiment of an automatic status register 400 (e.g., TAG Phase register) automatically compiled by data written to the various resources, e.g., to the temporary time slot registers 210–222 (FIG. 2).

In particular, in FIG. 4, the TAG Phase register 400 includes flip/flops 410–421 corresponding to bits 1 to 12 of the TAG Phase 400, and an OR gate corresponding to bit 0 of the TAG Phase, for insertion into time slot 0. Each flip/flop 410–421 receives a write enable pulse for the corresponding time slot register 210–222. As the various temporary registers 210–222 are written to by any processor, the write pulses for the time slot registers 210–222 are input as data to the flip/flops 410–421. The data on the inputs of the flip/flops 410–421 are clocked by any suitable system clock, and the flip/flops 410–421 are reset by an appropriately timed frame reset signal at one point in each frame signal, e.g., at the beginning of each frame signal.

Bit 0 of the TAG Phase register 400, which indicates the presence of valid data in any of the time slots 1 to 12, is formed by the OR gate 402. The OR gate 402 logically ORs all bits of the TAG Phase register 400 except for bit 0, and outputs a logic '1' if any of bits 1 to 12 is at a logic '1', thus indicating that at least one time slot contains valid data for the represented data frame. If none of bits 1 to 12 is active, then none of the time slot registers contain valid data corresponding to any of time slots 1 to 12 for the current data frame.

All bits of the TAG Phase register 400 are cleared every frame cycle, e.g., at the beginning of every frame cycle. Then, whenever a write occurs to the PUP 110, the corresponding bit in the TAG Phase register 400 will be automatically set by operation of the corresponding flip/flop 410–421.

For example, if during one frame a processor writes to the registers corresponding to time slots 1, 5 and 6, then bits 1, 5 and 6 of the TAG Phase register 400 will be automatically set to a one during the frame cycle which outputs that data, e.g., during the following frame cycle. At the end of every frame the TAG Phase register 400 and data associated with it are latched into shift registers and sent to the AC '97.

In a multi-processor system, e.g., as shown in FIG. 1, a write by any of the processors to any time slot register will set the corresponding bit in the TAG Phase register 400 for output during one frame. Moreover, whenever any of bits 1 to 12 in the TAG Phase register 400 become automatically set in response to a write to any of time slot registers 210–222, then bit 0 of the TAG Phase register 400 will also be set to indicate that there is valid data within the relevant frame.

Although the TAG Phase register 400 is shown and described with reference to an embodiment including flip/flops 410–421 and an OR gate 402, other type components may be implemented to create equivalent functionality. Moreover, while the TAG Phase register 400 and other devices in the PUP 110 are shown with respect to certain logic levels, it is known by those of ordinary skill in the art that opposite logic levels may be implemented within the principles of the present invention.

It will be appreciated by those of ordinary skill in the art that although the present invention was shown and described with respect to processors having separate read and write data buses, the invention is equally applicable to processors having shared read and write data buses. Moreover, it will be appreciated that the processors may be asynchronous to any or all other processors and/or components in a relevant system within the principles of the present invention.

Thus, in accordance with the principles of this aspect of the present invention, a single device does not have to expend processing cycles in the creation of a TAG Phase data word for word-wise writing to a time slot register.

In a multi-processor environment, processors typically operate independently and thus may not have knowledge of the use of time slots by other processors. Accordingly, implementation of the data for a TAG Phase value relevant to each frame by one processor in a conventional manner would be difficult if at all possible, most importantly because one processor would require the input of auxiliary information from other processors relating to the status of the status register, e.g., the register containing the TAG Phase value for output, e.g., in time slot 0. This aspect of the present invention allows for the creation of a TAG Phase on-the-fly which is always correct, even with a plurality of processors utilizing common time slot registers. The present aspect further provides correct and valid data in a status register such as a TAG Phase register even if a processor writes to a time slot register at the end of one frame but is not able to cause a register corresponding to a TAG Phase to be updated until the beginning of the next frame, i.e., until too late.

While the invention has been described with reference to the exemplary preferred embodiments thereof, those skilled in the art will be able to make various modifications to the described embodiments of the invention without departing from the true spirit and scope of the invention.

I claim:

1. A codec controller comprising:
   a first data bus;
   a second data bus; and
   a packer-unpacker module adapted for a first-come first serve protocol comprising an extra bits resister adapted for storage for at least two least significant bits of a data word in excess of first bit width of a first data bus over which said data word is transmitted to said second data bus.

2. The codec controller according to claim 1, wherein said extra bits register comprises:
   a plurality of latches.

3. The codec controller according to claim 1, wherein:
   said first data bus is 16 bits in width.

4. The codec controller according to claim 3, wherein:
   said extra bits register comprises latches for at least four least significant bits of said data word.

5. The codec controller according to claim 1, wherein:
   an output of said storage is effectively combined with said first data bus to provide a second data bus having a bit width larger than said first bit width.

6. The codec controller according to claim 1, wherein:
   said extra bits register provides said at least two least significant bits to a digital serial interface.

7. The codec controller according to claim 6, wherein:
   said digital serial interface is included in an audio codec.

8. The codec controller according to claim 7, wherein:
   said audio codec is substantially in conformance with the "AC '97 Audio Codec '97 Component Specification", revision 1.03, Sep. 15, 1996.

9. The codec controller according to claim 1, wherein:
   said extra bits register is adapted for temporary storage of information written from a processor.

10. The codec controller according to claim 1, wherein:
    said extra bits register is adapted for temporary storage of information to be read by a processor.

11. A method of extending a bit width of a data bus in a codec controller, comprising:
    providing a first data bus having a first bit width;
    providing an extra bits register in a packer-unpacker module accessible from said first data bus; and
    combining an output of said extra bits register with said first data bus to provide a second data bus having a second bit width larger than said first bit width.

12. The method of extending a bit width of a data bus in a codec controller according to claim 11, wherein:
    said combining is performed in a write cycle subsequent to a previous write cycle to store extra bits in said extra bits register.

13. The method of extending a bit width of a data bus in a codec controller according to claim 12, wherein:
    said combining is performed in a write cycle immediately subsequent to said previous write cycle.

14. The method of extending a bit width of a data bus in a codec controller according to claim 11, wherein:
    said first data bus is 16 bits in width.

15. The method of extending a bit width of a data bus in a codec controller according to claim 11, wherein:
    said extra bits register comprises 4 bits.

16. The method of extending a bit width of a data bus in a codec controller according to claim 11, wherein:

said extra bits register consists of 4 bits.

17. The method of extending a bit width of a data bus in a codec controller according to claim 11, further comprising:

providing said extra bits register with a unique input/output address with respect to said first data bus.

18. Apparatus for extending a bit width of a data bus in a codec controller, comprising:

means for providing a first data bus having a first bit width;

means for providing an extra bits register in a packer-unpacker module accessible from said first data bus; and means for combining an output of said extra bits register with said first data bus to provide a second data bus having a second bit width larger than said first bit width.

19. The apparatus for extending a bit width of a data bus in a codec controller according to claim 18, wherein:

said means for combining is adapted to perform said combining in a write cycle adjacent to a write cycle to store extra bits in said extra bits register.

20. The apparatus for extending a bit width of a data bus in a codec controller according to claim 18, wherein:

said first data bus is 16 bits in width.

21. The apparatus for extending a bit width of a data bus in a codec controller according to claim 18, wherein:

said extra bits register comprises 4 bits.

22. The apparatus for extending a bit width of a data bus in a codec controller according to claim 18, wherein:

said extra bits register consists of 4 bits.

23. The apparatus for extending a bit width of a data bus in a codec controller according to claim 18, further comprising:

means for providing said extra bits register with a unique input/output address with respect to said processor.

24. A codec controller, comprising:

a processor;

a 16-bit bus coupled to said processor;

a packer-unpacker module coupled to said 16-bit bus;

a 16-bit register in said packer-unpacker module coupled to said 16-bit bus;

an extra bits register coupled to said 16-bit bus; and an adder adapted to receive 16-bit data from said 16-bit register, to receive extra bits from said extra bits register, and to output an n-bit signal, wherein n is greater than 16.

25. The codec controller according to claim 24, wherein:

said 16-bit bus is a data bus.

26. An extra bits register comprising:

storage for at least two least significant bits of a data word in excess of a first bit width of a first data bus over which said data word is transmitted, wherein said extra bits register is adapted for temporary storage of information written from a processor.

27. An extra bits register comprising:

storage for at least two least significant bits of a data word in excess of a first bit width of a first data bus over which said data word is transmitted, said extra bits register is adapted for temporary storage of information to be read by a processor.

28. An extra bits register comprising:

storage for at least two least significant bits of a data word in excess of a first bit width of a first data bus over which said data word is transmitted, wherein said extra bits register provides said at least two least significant bits to a digital serial interface included in an audio codec.

29. The extra bits register according to claim 28, wherein:

said audio codec is substantially in conformance with the "AC '97 Audio Codec '97 Component Specification", revision 1.03, Sep. 15, 1996.

30. A method of extending a bit width of a data bus, comprising:

providing a first data bus having a first bit width;

providing an extra bits register accessible from said first data bus; and combining an output of said extra bits register with said first data bus to provide a second data bus having a second bit width larger than said first bit width, wherein said combining is performed in a write cycle subsequent to a previous write cycle to store extra bits in said extra bits register.

31. The method of extending a bit width of a data bus according to claim 30, wherein:

said combining is performed in a write cycle immediately subsequent to said previous write cycle.

32. The method of extending a bit width of a data bus according to claim 30, wherein:

said first data bus is 16 bits in width.

33. The method of extending a bit width of a data bus according to claim 30, wherein:

said extra bits register comprises 4 bits.

34. The method of extending a bit width of a data bus according to claim 30, wherein:

said extra bits register consists of 4 bits.

35. The method of extending a bit width of a data bus according to claim 30, further comprising:

providing said extra bits register with a unique input/output address with respect to said first data bus.

36. A method of extending a bit width of a data bus, comprising:

providing a first data bus having a first bit width;

providing an extra bits register accessible from said first data bus;

combining an output of said extra bits register with said first data bus to provide a second data bus having a second bit width larger than said first bit width; and providing said extra bits register with a unique input/output address with respect to said first data bus.

37. The method of extending a bit width of a data bus according to claim 36, wherein:

said combining is performed in a write cycle subsequent to a previous write cycle to store extra bits in said extra bits register.

38. The method of extending a bit width of a data bus according to claim 37, wherein:

said combining is performed in a write cycle immediately subsequent to said previous write cycle.

39. The method of extending a bit width of a data bus according to claim 36, wherein:

said first data bus is 16 bits in width.

40. The method of extending a bit width of a data bus according to claim 36, wherein:

said extra bits register comprises 4 bits.

41. The method of extending a bit width of a data bus according to claim 36, wherein:

said extra bits register consists of 4 bits.

42. Apparatus for extending a bit width of a data bus, comprising:

means for providing a first data bus having a first bit width;

means for providing an extra bits register accessible from said first data bus; and means for combining an output of said extra bits register with said first data bus to provide a second data bus having a second bit width larger than said first bit width, wherein said means for combining is adapted to perform said combining in a write cycle adjacent to a write cycle to store extra bits in said extra bits register.

43. The apparatus for extending a bit width of a data bus according to claim 42, wherein:

said first data bus is 16 bits in width.

44. The apparatus for extending a bit width of a data bus according to claim 42, wherein:

said extra bits register comprises 4 bits.

45. The apparatus for extending a bit width of a data bus according to claim 42, wherein:

said extra bits register consists of 4 bits.

46. The apparatus for extending a bit width of a data bus according to claim 42, further comprising:

means for providing said extra bits register with a unique input/output address with respect to said processor.

47. Apparatus for extending a bit width of a data bus, comprising:

means for providing a first data bus having a first bit width;

means for providing an extra bits register accessible from said first data bus;

means for combining an output of said extra bits register with said first data bus to provide a second data bus having a second bit width larger than said first bit width; and means for providing said extra bits register with a unique input/output address with respect to said processor.

48. The apparatus for extending a bit width of a data bus according to claim 47, wherein:

said means for combining is adapted to perform said combining in a write cycle adjacent to a write cycle to store extra bits in said extra bits register.

49. The apparatus for extending a bit width of a data bus according to claim 47, wherein:

said first data bus is 16 bits in width.

50. The apparatus for extending a bit width of a data bus according to claim 47, wherein:

said extra bits register comprises 4 bits.

51. The apparatus for extending a bit width of a data bus according to claim 47, wherein:

said extra bits register consists of 4 bits.

* * * * *